Dec. 15, 1970     P. R. BASFORD ET AL     3,547,701
FUEL CELL HAVING AN ELECTROLYTE COMPRISING
A FUSED VANADATE SALT
Filed March 17, 1967
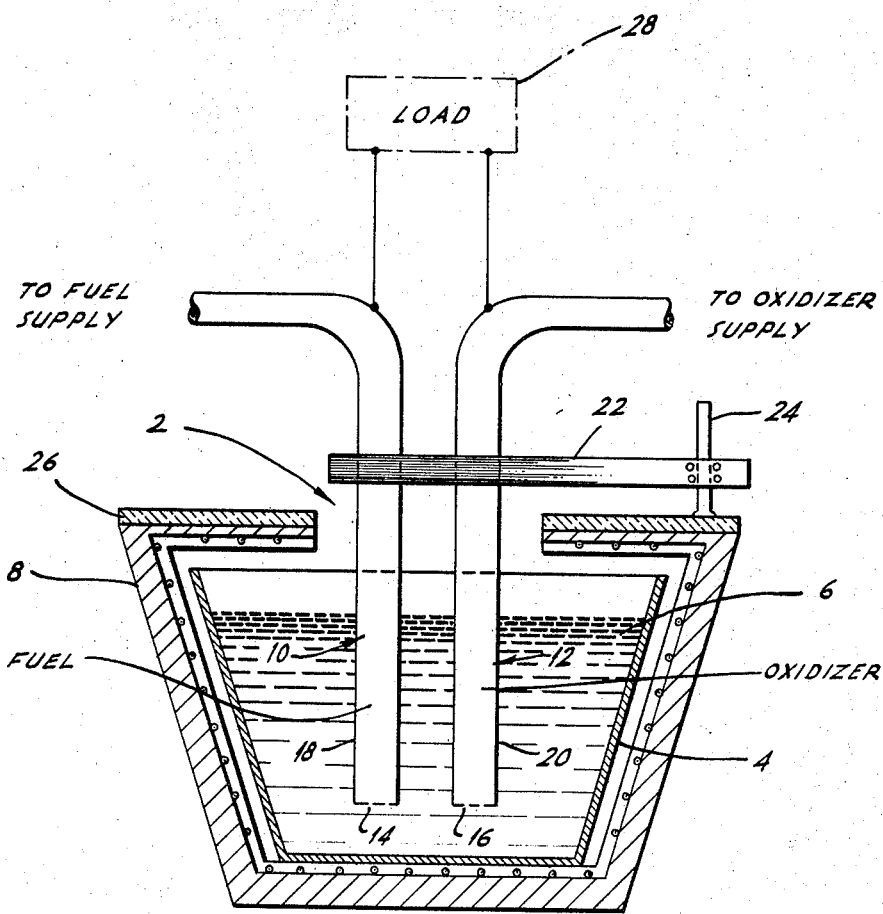
INVENTORS
PAUL R. BASFORD
MYRON H. BOYER
BY
Leonard Zalman
ATTORNEY

United States Patent Office 3,547,701
Patented Dec. 15, 1970

3,547,701
FUEL CELL HAVING AN ELECTROLYTE COMPRISING A FUSED VANADATE SALT
Paul R. Basford, Santa Ana, and Myron H. Boyer, Newport Beach, Calif., assignors to Philco-Ford Corporation, Philadelphia, Pa., a corporation of Delaware
Filed Mar. 17, 1967, Ser. No. 623,981
Int. Cl. H01r 27/20
U.S. Cl. 136—86                                 13 Claims

ABSTRACT OF THE DISCLOSURE

A high temperature fuel cell in which a gaseous fuel and an oxidizer are maintained in contact with a molten electrolyte composed of a vanadate salt or a mixture of vanadate salts.

---

Fuel cells may be divided broadly into two types which are designated as low temperature cells and high temperature cells. The approximate operating temperature range of low temperature fuel cells is from 25° C. to 250° C. and that of high temperature fuel cells is from 500° C. to 1000° C.

High temperature fuel cells are more advantageous than low temperature fuel cells because they can burn "cheap" fuels such as natural gas, vaporized gasoline, or the mixture of gases obtained from the gasification of coal. These fuels require an operating temperature in excess of 500° C. for the extraction of energy therefrom. In addition to burning "cheap" fuels, high temperature fuel cells can produce electrical energy without the necessity of a platinum catalyst at the electrodes.

The efficiency of a high temperature fuel cell depends to a great degree upon the electrolyte used in the cell. Many fused salts, such as salts formed from non-volatile acids, have been proposed by the prior art as electrolytes for high temperature fuel cells. However, none of the proposed electrolytes has been acceptable. For example, fused salts formed from sulphuric acid melt at such high temperatures that they are partially decomposed at their melting point.

It is therefore an object of the present invention to provide an improved high temperature fuel cell.

It is a further object of the present invention to provide a high temperature fuel cell having an improved electrolyte.

It is a still further object of the present invention to provide a high temperature fuel cell having a vanadate salt electrolyte.

In accordance with the present invention vanadate salts are used as the electrolyte in a high temperature fuel cell. In a preferred form of the present invention, eutectic mixtures of vanadate salts are used as the electrolyte in a high temperature fuel cell.

For a better understanding of the present invention together with other and further objects thereof reference should now be had to the following detailed description which is to be read in conjunction with the accompanying drawing which is a schematic representation of an apparatus suitable for the practice of the present invention.

Referring to the drawing, the fuel cell is identified, in general, by the reference numeral 2 and includes a crucible 4, suitably of nickel. Crucible 4 contains an electrolyte 6, the composition of which will be explained in detail presently.

Surrounding the crucible 4 is a heating device or furnace 8, shown as an electric resistance heating device adapted to be heated by the passage of current therethrough. The furnace 8 maintains the electrolyte 6 at the desired operating temperature. Since one of the products of the fuel cell is the generation of heat energy, an external source of heat, such as the furnace 8, may be unnecessary after the cell, properly insulated, is in actual operation.

A pair of identical hollow electrodes, generally identified by the reference numerals 10 and 12, are immersed in the molten electrolyte 6. Electrode 10 comprises a fine mesh screen 14 overlaying the end of a metal tube 18. Similarly, electrode 12 comprises a metal tube 20 and a mesh screen 16. Suitably, metal tubes 18 and 20 are one-quarter inch outside diameter nickel tubes and screens 14 and 16 are 150 mesh nickel screens. Electrodes 10 and 12 are arranged in a non-opposing configuration; that is, the tubes 18 and 20 are parallel and the screens 14 and 16 lie in a common plane, as shown in the drawing.

Electrode 10 is supplied with the fuel to be electrochemically consumed in the cell 2 and electrode 12 is supplied with an oxidizing agent for the fuel to be consumed. Suitably, the fuel can be a hydrocarbon in vapor form and the oxidizer can be oxygen. In the small current generating capacity fuel cell shown, the electrodes 10 and 12 are operated as dead end electrodes; that is, the fuel and the oxidizer are pumped into the tubes 18 and 20, respectively, and maintained there under such pressure that the fuel-electrolyte interface and the oxidizer-electrolyte interface are at the metal screens 14 and 16, respectively. Large capacity cells require circulation to and from the fuel electrode to remove reaction products, $CO_2$ and $H_2O$.

Electrodes 10 and 12 are supported by an electrically insulating plate 22 which is in turn supported by a support post 24. Support post 24 is mounted on the furnace 8 and thermally insulated therefrom by an insulating plate 26.

Electrodes 10 and 12 are connected to an external load, generally indicated at 28.

Referring again to the electrolyte 6, it has been found that vanadate salts are suitable electrolytes for high temperature fuel cells and produce higher current densities than previously known electrolytes. A single vanadate salt can be used as the electrolyte 6 or various mixtures of vanadate salts can be used as the electrolyte 6. Illustrative, but not restrictive of other vanadate salts that can be utilized as the electrolyte 6, are the alkali vanadates, eutectic mixtures of different vanadates of the same alkali metal, and euetectic mixtures of vanadates of different alkali metals. Preferably, the alkali vanadates should be restricted to the composition range between $X_3VO_4$ and $XVO_3$, where X denotes one of the alkali metals. Compounds richer in vanadium are composed of large complex anions, which do not migrate freely and which therefore build up the internal resistance of the fuel cell. Illustrative of eutectic mixtures of alkali vanadates that can be used are: (1) a $Li_3VO_4$–$LiVO_3$ eutectic mixture of 16.7 mole percent $Li_3VO_4$ and 83.3 mole percent $LiVO_3$, (2) a $Na_3VO_4$–$NaVO_3$ eutectic mixture of 28 mole percent $Na_3VO_4$ and 72 mole percent $NaVO_3$, and (3) a $Na_3VO_4$–$LiVO_3$–$NaVO_3$ eutectic mixture of 36.21 wt. percent $Na_3VO_4$, 10.35 wt. percent $LiVO_3$, and 53.44 wt. percent $NaVO_3$. The illustrative electrolytes have melting points between 500° C. and 600° C. and are therefore acceptable for high temperature fuel cells.

In operation of the fuel cell, the electrolyte 6 is heated to a temperature of approximately 600° C. by the furnace 8. The electrodes 10 and 12 are then immersed in the electrolyte 6 and the fuel and the oxidizer are pumped into the electrodes 10 and 12, respectively. For the purpose of this discussion, it will be assumed that oxygen, either pure tank oxygen, or, in some cases, air, is pumped into electrode 12 and that a hydrocarbon in vapor form is pumped into electrode 10. Suitable hydrocarbons are propane, butane, and ethane.

The fuel and the oxidizer are maintained under static pressure such that the fuel-electrolyte interface and the oxidizer-electrolyte interface are at the nickel screens 14 and 16, respectively. Once the desired interface positions have been achieved, great care should be taken to maintain the temperature of the electrolyte 6 constant. A change in the temperature of the electrolyte 6 changes the surface tension of the electrolyte 6. If the temperature rises while the pressure remains constant, the fuel and the oxidizer will bubble through the mesh screens 14 and 16, respectively. If the temperature drops while the pressure remains constant, the electrolyte 6 will flood the tubes 18 and 20. In either situation, the apparatus ceases to produce the desired electro-chemical reaction.

The high temperature of the electrolyte 6 dissociates the electrolyte 6 to produce metavanadate ($VO_3^-$) ions which react with the oxygen and electrons at electrode 12 to produce orthovanadate ($VO_4^\equiv$) ions:

$$VO_3^- + \tfrac{1}{2}O_2 + 2e^- \rightarrow VO_4^\equiv$$

The orthovanadate ions migrate through the electrolyte 6 to the electrode 10. At the electrode 10 the orthovanadate ions oxidize the hydrocarbon fuel to produce metavanadate ions and excess electrons as well as $CO_2$ and $H_2O$. The excess electrons produced flow through the external circuit 28 to the electrode 12 thus, chemical energy is converted directly into electrical energy.

Using the fuels mentioned it is possible to produce a current density of approximately 500 milliamps per square centimeter of electrode interface area. This shows a marked improvement in current generating capacity over prior art fuel cells.

Although the present invention has been described with reference to a fuel cell utilizing nonconfronting dead end electrodes, the electrolyte of the present invention is not limited to use in such fuel cells and can be used in fuel cells having, for example, sintered metal electrodes of various materials and of different configurations with or without provision for removing reaction products. Since sintered metal electrodes increase the effective electrode areas of the fuel cell, such cells will have greater current generating capabilities than that of the apparatus shown in the drawing.

What we claim is:

1. In a fuel cell for the direct generation of electrical energy from a fuel and an oxidizer, comprising at least one fuel electrode and at least one oxidizer electrode, said electrodes being separated from each other by a salt electrolyte fused at the operating temperatures of said cell, the improvement wherein said electrolyte comprises an alkali-metal vanadate having a composition within the range of $XVO_3$ to $X_3VO_4$ inclusive, where X denotes said alkali metal.

2. In a fuel cell for the direct generation of electrical energy from a fuel and an oxidizer, comprising at least one fuel electrode and at least one oxidizer electrode, said electrodes being separated from each other by a salt electrolyte fused at the operating temperatures of said cell, the improvement wherein said electrolyte comprises a mixture of different vanadate salts of the same metal.

3. A fuel cell according to claim 2 wherein said mixture consists essentially of the metavanadate salt of said metal and the orthovanadate salt of said metal.

4. A fuel cell according to claim 2 wherein said mixture is a eutectic mixture.

5. A fuel cell according to claim 2 wherein said metal is an alkali metal.

6. A fuel cell according to claim 2 wherein said metal is an alkali metal and said mixture consists essentially of the metavanadate and orthovanadate salts of said alkali metal.

7. A fuel cell according to claim 2 wherein said electrolyte consists essentially of a eutectic mixture of the metavanadate salt and the orthovanadate salt of an alkali metal.

8. A fuel cell according to claim 7 wherein said alkali metal is lithium.

9. A fuel cell according to claim 7 wherein said alkali metal is sodium.

10. In a fuel cell for the direct generation of electrical energy from a fuel and an oxidizer, comprising at least one fuel electrode and at least one oxidizer electrode, said electrodes being separated from each other by a salt electrolyte fused at the operating temperature of said cell, the improvement wherein said electrolyte comprises a mixture of vanadate salts of different metals, each of said vanadate salts having a composition within the range $X_3VO_4$ and $XVO_3$ inclusive, where X denotes an alkali metal.

11. A fuel cell according to claim 10 wherein said mixture is a eutectic mixture.

12. A fuel cell according to claim 10 wherein said different metals are sodium and lithium and said mixture is a eutectic mixture.

13. A fuel cell according to claim 10 wherein said electrolyte consists essentially of a eutectic mixture of sodium metavanadate, sodium orthovanadate and lithium metavanadate.

References Cited

UNITED STATES PATENTS

| | | | |
|---|---|---|---|
| 3,279,949 | 10/1966 | Schaefer et al. | 136—86 |
| 3,350,226 | 10/1967 | Lieb et al. | 136—86 |
| 3,360,401 | 12/1967 | Grasseli et al. | 136—86 |
| 3,367,801 | 2/1968 | Kreiselmaier | 136—86 |

FOREIGN PATENTS

| | | | |
|---|---|---|---|
| 222,283 | 12/1957 | Australia | 136—86 |

ALLEN B. CURTIS, Primary Examiner

U.S. Cl. X.R.

136—154